Dec. 1, 1964  W. F. METCALF  3,159,776
MODULAR CAPACITOR ASSEMBLIES
Filed Jan. 2, 1959
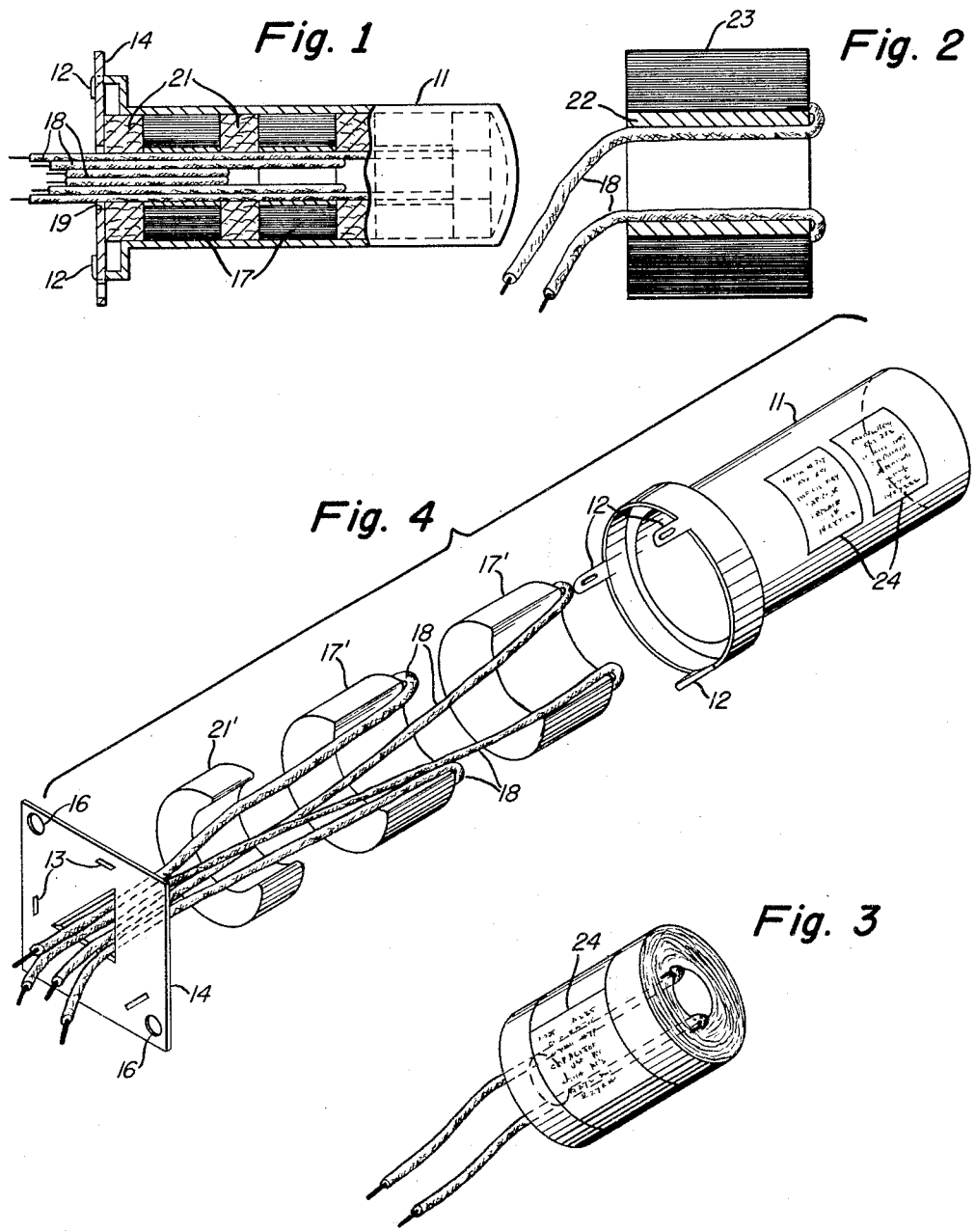
INVENTOR.
William F. Metcalf
BY
Merriam, Lorch & Smith
ATTORNEYS

United States Patent Office 3,159,776
Patented Dec. 1, 1964

3,159,776
MODULAR CAPACITOR ASSEMBLIES
William F. Metcalf, Las Vegas, Nev., assignor to
Elizabeth R. Metcalf
Filed Jan. 2, 1959, Ser. No. 784,718
1 Claim. (Cl. 317—242)

This invention relates to multi-section capacitors and more particularly it relates to multi-section capacitor assemblies the components of which can be assembled in various combinations of capacity and voltage rating as desired.

Multi-section electrolytic capacitors are well known. These capacitors typically consist of a sealed container, usually tubular in form, which encloses two, three or more capacitor sections, each of which may have a different electrical capacity and voltage rating. Capacitors of this type are typically used as filter capacitors in the power supplies of radio and television receivers. In order to provide an exact replacement for the many different varieties of such capacitors used in present day electronic equipment, it is necessary that a manufacturer make and a jobber or distributor keep in stock a thousand or more individual types of multi-section capacitors, representing each of the many combinations permitted by the variations in the number of sections, the electrical capacity of each section and the voltage rating of each section. Since the capacitor container is usually sealed when made, each of these combinations must be made in advance and kept on hand in anticipation of a future demand. As can be seen, the problems entailed in making and stocking such a large inventory of different capacitors are so severe that only rarely is a complete inventory stocked by a distributor.

The above-described difficulties are to a considerable extent obviated by the multi-section capacitor assemblies of this invention, which provides a "modular" construction wherein a preselected combination of desired individual capacitors is assembled to order in a standard case using spacers to fill the voids in the case when the complete volume thereof is not required to hold the required electrical capacity. The number of individual items which must be made and/or stocked using the construction of this invention is greatly reduced and consists only of a supply of cases, spacers, and individual capacitor units which can be put together in any combination as desired.

The multi-section capacitor assemblies of the invention will be more clearly understood from the following detailed description thereof, taken in conjunction with the appended drawings, in which like numerals are used to designate the same elements in the several views. In the drawings:

FIGURE 1 is a partial sectional view of one embodiment of a multi-unit capacitor assembly in accordance with the invention;

FIGURE 2 is an enlarged sectional view of an individual capacitor unit of the type used in the assembly of FIGURE 1;

FIGURE 3 is an isometric view of the capacitor unit of FIGURE 2; and

FIGURE 4 is an exploded view of another embodiment of a multi-section capacitor assembly of the invention.

Referring to the figures, it can be seen that the assemblies of the invention comprise a case 11, preferably cylindrical in form, which is open at one end. Case 11 is provided at its open end with lugs 12 which are spaced to pass through the holes 13 provided in mounting washer 14 which acts as an end cap or closure member for the case. Mounting washer 14 is also supplied with holes 16 which enable it to be mounted on a television or radio chassis.

Located within case 11 are a number of individual capacitor units 17, the electrical capacity and voltage rating of each of which have been preselected by the person who assemblies the entire capacitor assembly. The individual capacitor units are preferably generally cylindrical in form and of a diameter which permits a snug fit within case 11. Each of capacitor units 17 is provided with a pair of insulated electrical conductors 18, of which one is connected to the anode foil of the capacitor and one to the cathode foil thereof. In order to provide clearance for the passage of these lead wires along the length of case 11 each of the capacitor units is provided with suitable clearance space such as a longitudinal recess or annular opening, as will be described in greater detail hereinafter. The lead wires from each of the individual capacitor units 17 emerge from mounting washer 14 through a hole 19 provided for this purpose.

FIGURE 1 shows a capacitor assembly made in accordance with the invention. In this embodiment, the individual capacitor units 17 are cylindrical in form and are provided with central circular holes extending longitudinally therethrough, as shown in detail in FIGURE 2. The complete capacitor assembly is made of a combination of the desired individual capacitor units plus resilient spacers 21 which are used to take up the excess volume in case 11 not required by the capacitor units themselves. In the embodiment of FIGURE 1, spacers 21 have the form of annular disks and may be made of any material such as felt, rubber, sponge rubber, polyurethane foam or other synthetic plastic which is resilient and will serve the purpose of preventing excessive vibration of the capacitor units within the capacitor assembly.

The method of assembling the multi-section capacitor is obvious from the drawings. The desired combination of individual capacitor units 17 having the electrical capacity and voltage ratings desired, together with a suitable number of the spacers 21 are inserted in case 11 in any desired order, the lugs 12 on case 11 being fitted through the openings provided therefor in mounting washer 14 and then bent over. The lead wires from the capacitor units are threaded through the annular holes in each capacitor and spacer and emerge from the mounting washer through the opening 19 provided therein.

A preferred form of the individual capacitor units used in the embodiment of FIGURE 1 is shown in FIGURE 2. The capacitor is made by winding the customary anode and cathode foils around a central hollow bobbin 22 made typically of cardboard, paper, wood or the like until the unit has the desired capacity. A protective sleeve or jacket 23 encases the capacitor and serves to protect the same from damage in handling. It is preferred to have the leads 18 which are connected to the anode and the cathode foils of the capacitor respectively make a 180° bend over the edge of the central bobbin, pass through the central hole and emerge on the other side of the capacitor unit, as shown. When used, the capacitor unit is inserted in case 11 with the junction end thereof (i.e., the end containing the joints between the leads and the foils) away from the open end of the case. Thus, when tension is put on the leads, as possibly during stripping of the insulation thereof, the major portion of the force is absorbed by the bobbin so that the likelihood of pulling loose a lead is decreased.

The ends of the wound capacitor may be protected against damage caused by penetration of moisture by any suitable method known to those skilled in the art. A preferred method is to dip the ends in a suitable liquid resin such as a phenolic resin which hardens to give a protective coat.

In another embodiment, shown in FIGURE 4, a somewhat different configuration is used for the individual capacitor units and the associated spacer units. In this embodiment, the capacitor units 17' are provided with a peripheral recess rather than a central opening. The recess provides sufficient clearance for all the leads from the capacitors to pass down the sides of the case 11. The spacer 21' used with these capacitor units is preferably U-shaped as shown, although this is not necessary as will be apparent to those skilled in the art. Any suitable method of forming the recess in the periphery of the units 17' may be used. Thus, for example, the capacitor may be wound about a cylindrical core having such a recess which would cause a similar recess to appear on the finished capacitor. After winding, a protective sleeve or jacket may be slipped over the unit and the ends may be sealed by dipping, as described above. In this embodiment, the joint between the foils and the leads is preferably made at a point near the periphery of the capacitor rather than near its center, so that the leads can be bent in a 180° curve around the outer protective sleeve or jacket which then serves to increase the resistance to tearing loose of the leads.

The completed capacitor units, such as that shown in FIGURE 3, are preferably provided with pressure sensitive gummed labels 24 containing information regarding the characteristics of the unit, including the capacity and voltage ratings thereof. It is also preferred to color code the leads of the units with a suitable code whereby the polarity, electrical capacity and voltage rating thereof is shown on the leads. This could be done by a combination of base and stripe colors on each lead or by any other method as will be apparent to those skilled in the art.

When the multi-section capacitor is being assembled, the pressure sensitive gummed label is removed from each of the individual capacitor units and affixed to the case as shown in FIGURE 4. The labels plus the color coding on the leads enables quick and easy determination to be made of the characteristics of the units comprising the assembly from either side of the chassis on which the assembly is mounted.

It can be seen that the invention obviates most of the inventory problems heretofore encountered in stocking the great number of individual multi-section capacitors required for replacement purposes in servicing electronic equipment. By keeping in stock only a supply of the individual capacitor units, suitable spacers, empty cases and mounting washers, any desired combination of individual capacitor units can be made as required for a particular job or order. It can be seen that the total number of items which must be stocked is greatly diminished since all the possible combinations of the components are not made before hand, but rather only as the need for them arises.

A further advantage of the invention results from the fact that each capacitor unit in an assembly is individually removable and replaceable. Thus if one section of a multi-section capacitor unit in use on a piece of electronic equipment is found defective, only the defective unit need be replaced. This is in contrast to the commonly used fixed multi-section capacitor in which failure of one section necessitates replacing the entire assembly.

The foregoing detailed description has been given for clearness of understanding only, and no unnecessary limitations should be understood therefrom, as modifications will be obvious to those skilled in the art.

What is claimed is:

A modular multi-section capacitor assembly comprising, in combination, a cylindrical container open at one end, a closure member for covering said open end, said member having a substantially centrally located aperture, means for removably securing said closure member to the container, a plurality of substantially cylindrically shaped capacitors each having a longitudinal central aperture, all of said capacitors being coaxially disposed relative to each other with the central apertures aligned, all of said capacitors fitting snugly within said container, each of said capacitors including an anode foil and a cathode foil, a soft centrally apertured resilient shock-absorbing spacer interposed between each of said capacitors, said spacers serving to immobilize said capacitors within said container, and a plurality of flexible insulated conductors, each individual conductor having one end extending through said aperture and another end electrically connected to a respective one of said foils on a respective single one of said capacitors at the end thereof away from said aperture, the conductors extending between the associated capacitor and the cap aperture by passing through the central aperture of each capacitor and spacer more closely positioned relative to the open end of the container than the capacitor to which it is connected and electrical connection between said individual capacitors being adapted to be established external to said container, said capacitors and spacers being capable of disassembly into the component parts thereof without significant damage to any of said component parts.

References Cited in the file of this patent
UNITED STATES PATENTS

| | | |
|---|---|---|
| 1,868,120 | Sievert et al. | July 19, 1932 |
| 1,991,707 | Silbermann | Feb. 19, 1935 |
| 2,018,486 | Cole | Oct. 22, 1935 |
| 2,107,132 | Smith | Feb. 1, 1938 |
| 2,142,705 | Tarr | Jan. 3, 1939 |
| 2,160,646 | Coutlee | May 30, 1939 |
| 2,290,304 | Waterman | July 21, 1942 |
| 2,488,763 | Charlin | Nov. 22, 1949 |